Dec. 6, 1949    E. F. CHAMPAYGNE ET AL    2,490,673
X-RAY DIFFRACTION PHOTOMETER
Filed June 16, 1948    2 Sheets-Sheet 1
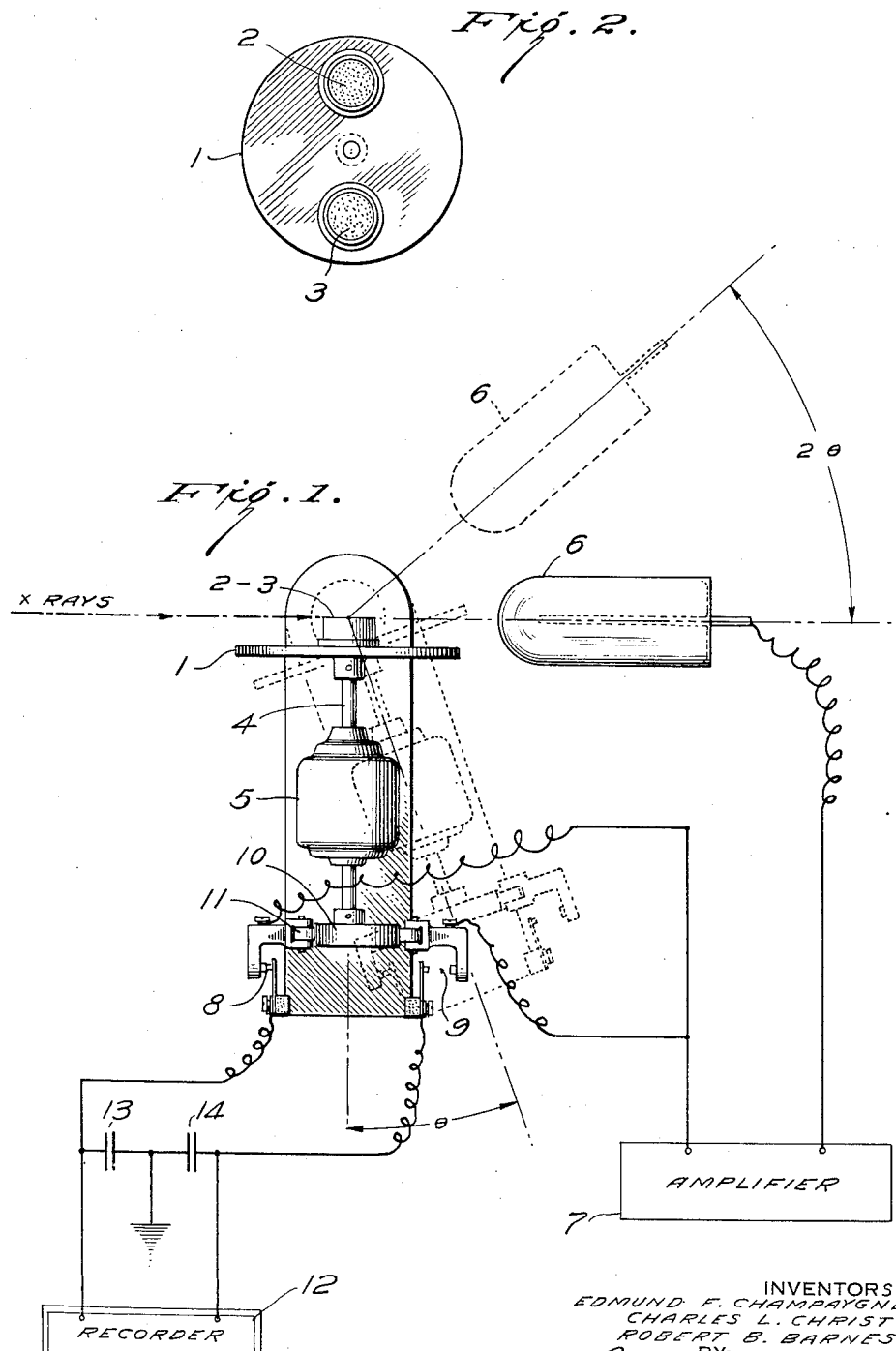
INVENTORS
EDMUND F. CHAMPAYGNE,
CHARLES L. CHRIST,
ROBERT B. BARNES,
BY
ATTORNEY Dec. 6, 1949     E. F. CHAMPAYGNE ET AL     2,490,673
X-RAY DIFFRACTION PHOTOMETER
Filed June 16, 1948     2 Sheets-Sheet 2
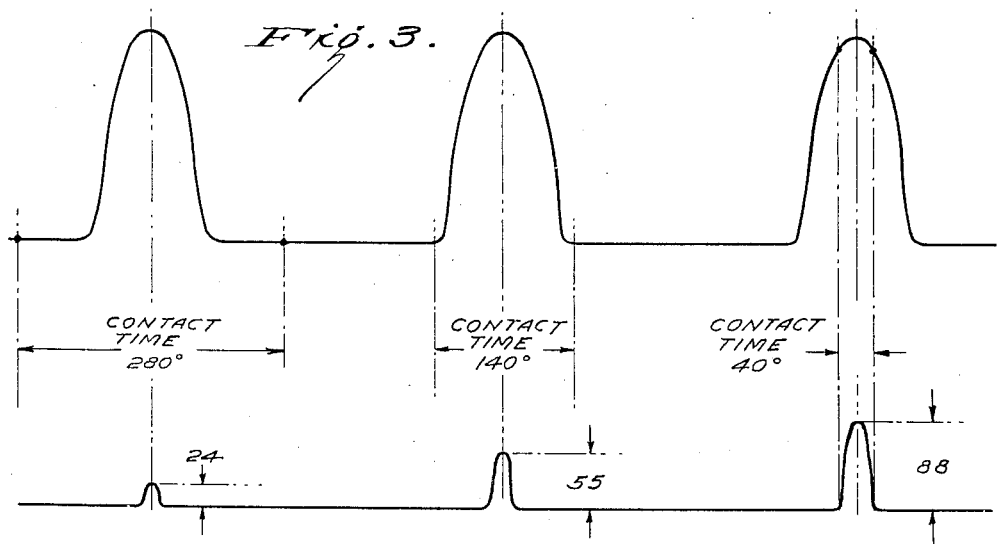
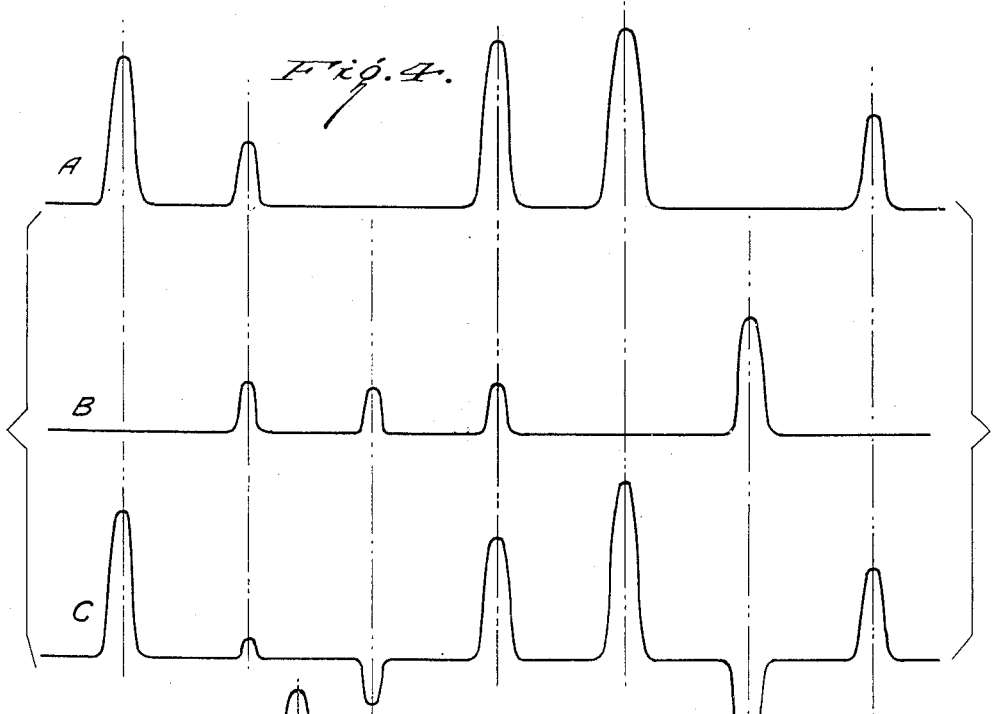
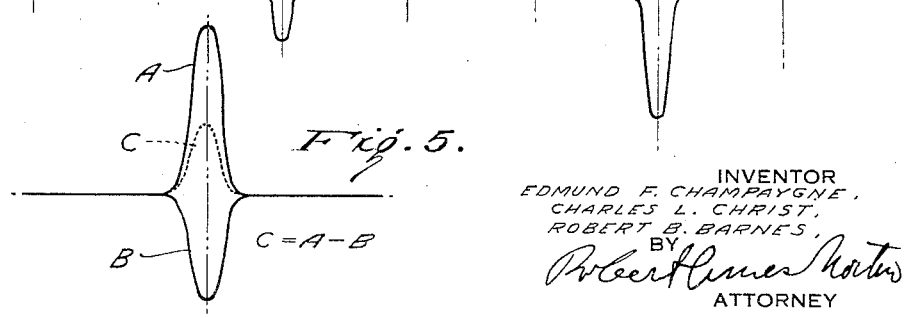
INVENTOR
EDMUND F. CHAMPAYGNE,
CHARLES L. CHRIST,
ROBERT B. BARNES,
BY
ATTORNEY Patented Dec. 6, 1949

2,490,673

UNITED STATES PATENT OFFICE 2,490,673

X-RAY DIFFRACTION PHOTOMETER

Edmund Francis Champaygne, Noroton Heights, Charles L. Christ, Old Greenwich, and Robert Bowling Barnes, Stamford, Conn., assignors to American Cyanamid Company, New York, N. Y., a corporation of Maine Application June 16, 1948, Serial No. 33,318

5 Claims. (Cl. 250—52)

This invention relates to a method and apparatus for obtaining comparisons of samples subjected to radiant energy.

A number of problems have arisen in connection with the comparisons of response of samples to radiant energy. This problem arises in visual photometric and spectrophotometer comparisons, the comparison of the response of samples to ultra-violet or infrared radiation, comparison of X-ray and electron diffraction patterns and the like. A satisfactory solution has been obtained in the case of the spectrophotometric measurements in the visual and near ultra violet and infrared ranges by using the various types of recording flickering beam spectrophotometers. However, there has been no simple solution of the similar problems presented by various diffraction patterns both X-ray and electron and certain aspects of infrared analysis. The type of solution presented by the method and apparatus of the present invention is applicable to the visual field as well as the others referred to above but because the problem is less acute in the visual field due to the availability of simple recording comparison apparatus, the invention is of primary importance in other fields.

The general type of solution to which the present process and apparatus is applicable is one where the responses to radiant energy of two or more samples are detected and transformed into electrical energy either current or voltage.

Essentially, the present invention rotates in synchronism a plurality of samples and electrical contacts bringing the samples successively into the beam of radiant energy. The contacts are so positioned that the responses from detectors of radiant energy striking the two samples are connected to separate circuits or to opposite connections on a differential circuit. The electrical response from the radiation detector receiving radiant energy from each sample is thus isolated and comparisons are obtainable.

The method and apparatus of the present invention have the advantage that comparative responses are obtained which are not materially affected by ambient changes in temperature, radiation sources, amplifications and the like. In other words, in each cycle the method and apparatus may be considered as self-calibrating. This is an important practical advantage because many radiation sources are not constant either with time, frequency, or both. Only with flickering beam spectrophotometers in the visual and near infrared and ultra violet regions has any comparable degree of self-calibration been achieved.

While the features of comparison and automatic calibration are common to all of the modifications of the present invention, it is possible in many cases to effect at the same time an intensity increase or amplification of response which for practical purposes may introduce a completely new type of amplification having a factor of as much as 4 to 1. In a more specific aspect of the invention combined comparison and inherent amplification is included. The amplification factor results where the radiant energy is in the form of pulses having higher peak values than average values and is obtained by choosing a contact time for the contacts which corresponds only with a pre-determined portion of the pulse where the power of the pulse is at a maximum or at a high average level.

One of the most important fields of application of the present invention is in recording X-ray diffraction spectrophotometers, especially those in which X-ray diffraction patterns are scanned by a Geiger counter tube with accompanying circuit. The invention will therefore be described in greater detail in conjunction with such a device, the applicability to similar problems involving other forms of radiant energy being brought out during the discussion.

In an ordinary recording X-ray spectrometer, for example, the type which is commercially available from the Phillips North American Company, an alternating current actuated X-ray tube is used producing a pulsating beam of X-rays consisting in pulses having a cycle duration of less than $\pi$ radians of the cycle. X-rays are only produced on one-half of the sine wave of alternating voltage and as each X-ray requires a certain threshold voltage, the pulse does not start until the alternating voltage has reached a certain minimum figure. The beam of X-rays strikes a suitable sample such as a powdered material. A Geiger counter tube and the sample surface plane are rotated in the horizontal plane, the former at twice the angular rate of the latter so that the tube successively scans successive diffraction bands or lines. The rate of movement of the tube is, of course, very small compared to the frequency of the X-ray pulses. During any one X-ray pulse at the diffraction lines there are different amounts of quanta of X-rays, the quantum density being at a maximum at the point of maximum pulse energy. The Geiger tube and associated circuits as usual counts each quantum, producing an amplified electric pulse which is fed into a recorder having a time constant so that the responses from the quanta are integrated. Such a circuit requires capacity and resistance and the response of the recorder thus constitutes the difference between the energy stored up from the Geiger contact circuit pulses during the time when an X-ray pulse strikes the sample less the average loss through leakage throughout the whole cycle, including a dead time between pulses of more than $\pi$ radians. In the ordinary recorder, the output moves a pen over a slowly moving recording surface and a trace results which is proportional to the intensity of the various diffraction lines.

The common recording X-ray spectrometer will not give an accurate, comparative result for two or more samples except in a rough semi-quantative way by running first one sample and then the other and comparing the graphs. This is a serious disadvantage. In the first place scanning time is doubled and comparison time added. The graphs are not necessary quantitatively accurate because back ground noise and changes in X-ray radiation electrical supply to the amplying circuits all contribute to the graph produced and make an accurate and fast quantative comparison impossible.

When the method and apparatus of the present invention is used, two or more samples are alternately introduced into the X-ray beam, for example, by mounting them on a rotating plate, each sample being in position so that it receives only a single X-ray pulse. At the same time electric contacts are actuated in synchronism so that the Geiger counter output when each sample is in the X-ray beam is directed to a separate recording circuit or to separate branches of a suitable differential recording circuit. For example, the record of the pulses from one sample may be downward from a central chart line and the other upward.

A very accurate comparative measurement is obtainable because the samples are compared by exposure to successive X-ray pulses, the exposure time being so short that there is no substantial change in radiation intensity, the device, therefore, constantly calibrating itself.

More than one sample may be used with a corresponding number of contacts but for most operations it is not necessary to compare more than two.

In an infrared spectrophotometer, the problem of obtaining an accurate infrared spectrogram is caused by the fact that the intensity of infrared radiation varies with frequency, therefore, an infrared absorption or transmission curve must be compared point by point against a curve of the emission of the source in order to obtain a record of the absorption of the sample. The method of the present invention avoids such a time consuming operation. It is only necessary to introduce the sample periodically into the infrared beam and introducing the response of the radiation detector, which may be a thermo-couple or a bolometer through the contacts into a differential recording circuit so that a record is always obtained which is the difference between signal from the infrared beam itself and that from the beam passing through the sample. A curve can then be recorded which gives infrared absorption with frequency directly.

In each case where the comparison effect of the present invention is used, it may be combined with an amplifying effect when the contacts are adjusted to correspond to the portion of the cycle in which maximum energy is being radiated.

The invention will be described in greater detail in conjunction with the drawings in which:

Fig. 1 is a semi-diagrammatic plan of a recording X-ray diffraction spectrometer;

Fig. 2 is an elevation view of the sample holders;

Fig. 3 represents two curves showing variation of responses to X-ray pulses with contact times;

Fig. 4 is a series of three curves showing responses from two samples and a resulting differential response; and, Fig. 5 is a detail showing the differential response to a single diffraction line with two samples.

Fig. 1 shows the application of the present invention to a typical X-ray diffraction spectrometer of the recording type. The X-rays appear from the left from a conventional pulsating source (not shown) and strike samples in holders 2 and 3 which are mounted on and project above a plate 1. The beam strikes the samples at an angle within the range usually employed for X-ray diffraction measurements. The plate 1 is mounted on a shaft 4 which is rotated by the motor 5. A Geiger counter tube 6 receives X-rays diffracted from the samples and features an amplifier 7 of conventional design. The plate 1 and tube 6 are movable about a vertical axis through the center of the samples by the usual means in X-ray spectrometers. For clarity these are not shown as they are not changed by the application of the present invention and therefore do not constitute any part thereof. As is usual, the rate of angular movement of the Geiger counter 2 is double that of the sample holders in the horizontal plane in order to match the doubling of the angle of diffraction. The scanning effect is obtained as in ordinary X-ray spectrometers. A second position corresponding to a particular X-ray diffraction line is shown in the drawings.

The rotation of the plate 1 successively brings the two samples into the X-ray beam and is synchronized at one half the frequency of the X-ray source so that each sample is brought into the beam during successive single X-ray pulses. The motor also turns a cam 10 provided with followers 11 which successively open and close contacts 8 and 9. These contacts serve to connect the ungrounded side of the output of the amplifier 7 to opposite sides of the input circuit of the recorder 12. The latter is of conventional design. As shown in the drawing, the output voltages of the amplifier 7 are developed across equal condensers 13 and 14, the time constant of the recorder being greater than pulse frequency. The cam is adjusted so that the contacts are closed in the center of the X-ray pulse for each sample. The recorder, therefore, receives a voltage which is the differential of that produced by the Geiger counter when scanning the diffraction lines of the two samples. It will be apparent that a comparison is made every revolution of the plate 1, the time involved being so short that no changes in average X-ray pulse intensity result. In other words, the device makes a comparison every cycle and is thus constantly calibrating itself.

Most samples which are examined for X-ray diffraction are solids which may be powders. The drawings illustrate sample holders suitable for use with such materials. It is, however, sometimes desirable to measure the diffraction patterns of liquids and other materials which are not sufficiently cohesive to be retained in the ordinary type of sample holder illustrated. In such cases the sample holders may be provided with a suitable cover of material which is transparent to X-rays and does not itself give a diffraction pattern which would mask that of the substances. A typical material for such a cover or window is very thin gauge beryllium. The diffraction pattern of beryllium falls in a range which is not likely to conflict with the patterns of most liquid materials which would be examined. Other substances may be used for the window for special purposes in the rare cases where beryllium would give a seriously interfering diffraction pattern.

The duration of time in which the contacts 8 and 9 close depends on the shape of the cam 10 and the position of the contact elements. The contact time may be adjusted from something less than one pulse cycle to a much smaller fraction. This is shown in Fig. 3 where three pulses of uniform amplitude are shown. In terms of the frequency of the alternating current of the X-ray tube, each pulse lasts for less than one half a cycle, actually as shown about 140°. This is because no X-rays are emitted until the alternating voltage reaches a certain threshold value in the positive wave of the cycle. This leaves some 220° of the cycle during which there are no X-rays. This is usually referred to as the dead time.

If the contact time is very long, for example 280° as shown for the first X-ray pulse, the Geiger counter tube 6 will feed voltage into the amplifier and thence into the recorder only for 140° and the average level of this voltage during this time will be a fraction of the peak voltage. Since the recorder has a circuit involving a time constant, energy leaks off the charging condenser during the dead time and even during the portion of the actual pulse when the voltage is below peak voltage. Amplifier and recorder will, therefore, give an average response which is shown by the small first peak in the bottom curve of Fig. 3. When the contact time is decreased to 140° as shown in the second pulse in Fig. 3, there is no leaking of energy during the dead time and a much stronger pulse is observed, actually a pulse which is somewhat more than twice as great as in the case of the 280° contact time. The third pulse in Fig. 3 shows the effect of a 40° contact time which corresponds to the peak portion of the pulse. No leak results during the time of lower energy and during the dead time and a much greater response is obtained which is shown as about four times for the 280° contact. This latter corresponds to the situation encountered in the ordinary X-ray spectrometers known hitherto. The increase in amplification is almost four times. Theoretically, an amplification factor of four can be obtained, but usually practical design consideration make a contact time of less than about 40° undesirable.

Figs. 4 and 5 show the effect of a differential recorder circuit such as that illustrated in Fig. 1. Curves A and B of Fig. 4 represent energy pulses from the amplifier 7 corresponding to X-ray diffraction lines of two different samples. These are not responses from a single X-ray pulse as the scanning rate of the recorder is such that each band encounters a large number of X-ray pulses before the slow moving Geiger tube 6 passes it. Curves A and B, therefore, represent the type of curves which would be drawn by an ordinary recording spectrometer.

When the arrangement in Figs. 1 and 2 is employed, these two curves are scanned simultaneously, first one sample being in the beam and then the other, and the recorder records the energy responses in a differential circuit, the recording element being adjusted so that the base lines in the curves in Fig. 4 represent the neutral point of the differential circuit. The energy from the first sample represented by curve A tends to move the recording element of the recorder up and that of B down. The resulting differential curve is shown at C. It will be noted that in the case of the first and last lines of curve A there is no corresponding line in curve B and these are, therefore, reproduced above the neutral line in their natural height in curve C. The third and sixth bands appear only in curve B and are reproduced in curve C in their natural size below the line. The second band represents a situation where there is a slightly stronger line in curve A than in curve B. The result is a small differential response in curve C in the direction of the stronger line. The fourth line represents a similar situation in which the difference between curve A and curve B is large and here the differential response is considerably greater than in the case of the second line. Fig. 5 shows graphically how this latter result is obtained.

The invention has been illustrated in conjunction with an X-ray diffraction spectrometer. The same type of response can be obtained in an electron diffraction device using electron beams in an evacuated vessel.

The recorder in Fig. 1 is shown as a straight differential recorder. For many purposes this is the most useful type. However, it is not necessary that the differential circuit be of this type. Other conventional differential circuits which give ratios between two amplifier outputs may also be used. The nature of the circuit in the recorder forms no part of the present invention and it is an advantage that the features of the present invention may be used with any conventional differential or other recording circuit.

In Fig. 1 the cam actuating the movable contacts is shown as driven from a shaft actuated by the same motor which turns the sample holder plate. This is a more compact arrangement presenting some advantages. On the other hand, the whole mechanism has to be rotated and for certain purposes it is desirable to drive two synchronous motors, one operating the contacts and the other rotating the plate carrying the sample holders. The operation is, of course, identical regardless of whether the synchronism of the contacts and sample holder plate rotation is effected by rigid mechanical connection or by synchronous electrical connection.

We claim:

1. A comparison device for comparing radiant energy responses from a plurality of samples comprising in combination means for producing a pulsating beam of radiant energy, means synchronized therewith for introducing sample holders successively into the beam during successive radiant pulses, a radiant detector positioned to receive radiation from said sample holders when introduced into the pulsating beam and capable of transforming the radiant energy into electrical output, indicating means responsive to said electrical energy, circuits including movable contacts connecting said indicating means to the electric output of said detector and means operating in synchronism with the sample holders to close the movable contacts during at least a portion of each radiant energy pulse.

2. A device according to claim 1 in which the indicating means constitutes a recorder with a differential input connected to the movable contacts.

3. In an X-ray diffraction spectrometer comprising a pulsating X-ray beam striking a sample holder and means for rotating said sample holder and a Geiger counter scanner, the latter moving at twice the angular rate of the former, the improvement which comprises a movable and rotatable element provided with a plurality of sample holders, means for moving said element in synchronism with the X-ray pulse to introduce successively different sample holders into the beam during said pulse, a plurality of movable contacts, connections from the output of the Geiger counter amplifier to said contacts, and means operating in synchronism with said sample holder means to close a contact during at least a portion of the exposure of each sample holder to an X-ray pulse.

4. A device according to claim 3 in which the element provided with sample holders is a rotating plate driven by a synchronous motor.

5. A device according to claim 4 in which a recorder with a differential input circuit is provided and the movable contacts are connected to the sides of said differential circuit whereby the recorder receives an output which is a differential between diffracted X-rays from said sample holders when holding samples.

EDMUND FRANCIS CHAMPAYGNE.
CHARLES L. CHRIST.
ROBERT BOWLING BARNES.

REFERENCES CITED

The following references are of record in the file of this patent:

UNITED STATES PATENTS

| Number | Name | Date |
|---|---|---|
| 2,074,226 | Kunz et al. | Mar. 16, 1937 |
| 2,394,703 | Lipson | Feb. 12, 1946 |

FOREIGN PATENTS

| Number | Country | Date |
|---|---|---|
| 506,022 | Great Britain | May 22, 1939 |

OTHER REFERENCES

Review of Scientific Instruments, Sept. 1946, p. 345 by E. F. Champaygne.